United States Patent Office 3,850,932
Patented Nov. 26, 1974

3,850,932
5-[2-CARBOXY AND 2-CARBOALKOXY-PHENYL-AMINO]-1,2,4-TRIAZOLO-QUINAZOLINES
Faizulla G. Kathawala, West Orange, N.J., assignor to Sandoz-Wander, Inc., Hanover, N.J.
No Drawing. Filed June 28, 1973, Ser. No. 374,464
Int. Cl. C07d 5/42
U.S. Cl. 260—256.4 F      15 Claims

ABSTRACT OF THE DISCLOSURE

The invention discloses 5-[2'-carboxy and 2'-carbo- and 1,2,4-triazolo[1,5-c]quinozolines having pharmacological activity in animals and useful, for example, as anti-inflammatory agents The compounds may be prepared, for example, by reacting a 5-halo-1,2,4-trazoloquinazoline with a compound representing the function to be introduced at the 5-position. The 5-halo-1,2,4-triazolo[4,3-c]quinazolines may be prepared by reacting a 4-hydrozino-quinazoline with trimethoxy methane. The 5-halo-1,2,4-triazolo[1,5-c]quinazolines are prepared from the corresponding 1,2,4-triazolo[1,5-c] quinazolin-5(1H)-one using phosphorus oxychloride, the quinazolin-5(1H)-one being in turn prepared from the 5-halo-1,2,4-triazolo[4,3-c]quinazoline.

The present invention relates to 5-[2'-carboxy and 2'-carboalkoxy - phenylamino]-1,2,4-triazolo[4,3-c]quinazolines and to 5-[2'-carboxy and 2'-carboalkoxyphenyl-amino]1,2,4-triazolo[1,5-c]quinazolines and to their preparation. The invention also relates to pharmaceutical compositions and methods utilizing the pharmacological properties of such compounds.

In accordance with the present invention there is provided 5-substituted-1,2,4-triazolo[4,3-c]quinazolines and 1,2,4-triazolo[1,5-c]quinazolines which collectively may be represented by the following structural formula I:

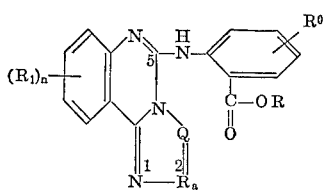

wherein

Q and $R_a$ are different and either a nitrogen atom or a =CR'— function;
R is hydrogen, lower alkyl of 1 to 4 carbon atoms or a pharmaceutically acceptable cation;
$R^0$ is hydrogen, lower alkyl of 1 to 4 carbon atoms, halo of atomic weight of from 18 to 36, lower alkoxy of 1 to 4 carbon atoms or trifluoromethyl
R' represents hydrogen or lower alkyl of 1 to 4 carbon atoms;
$R_1$ represents halo of atomic weight of from 18 to 80, lower alkyl of 1 to 3 carbon atoms, lower alkoxy of 1 to 3 carbon atoms, trifluoromethyl or, when n is 2, the two $R_1$ together form methylenedioxy; and
n is 0, 1 or 2, and when 2, then $R_1$ may be the same or different; provided that n is 1 when $R_1$ is trifluoromethyl.

The invention also provided procedures for the production of the compounds of formula I, characterized by
(A) Producing a compound of formula Ia;

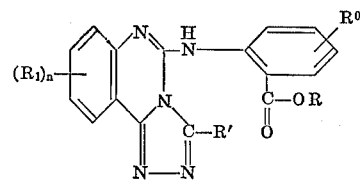

in which $R_1$, n, R, $R^0$ and R' are as defined above, by reacting a compound of formula II;

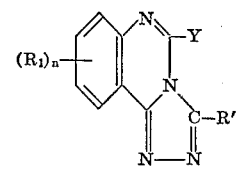

in which
$R_1$, R' and n are as defined above, and
Y signifies a chlorine or bromine atom,
with a compound of formula III:

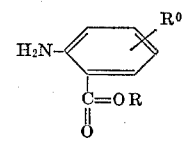

in which R and $R^0$ are as defined above;
(B) Producing a compound of formula Ib:

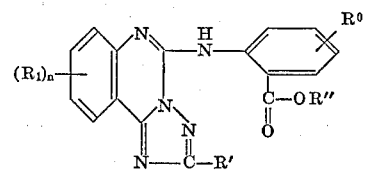

in which $R_1$, n, R, and $R^0$ are as defined above, and R" is alkyl of 1 to 4 carbon atoms, by reacting a compound of formula Ia, stated above, with a strong base under anhydrous conditions, preferably with a compound of the formula IV:

$$MOR''  \quad\quad IV$$

in which
R" is as defined above, and
M signifies an alkali metal or alkaline earth metal cation;
(C) Producing a compound of formula Ia, stated above, by reacting a compound of formula V:

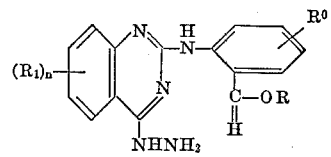

in which $R_1$, n, $R^0$ and R''' are as defined above,
with a compound of formula VI:

$$R'—C[O—(CH_2)_m—CH_3]_3 \quad\quad VI$$

in which R' is as defined and m signifies 0 to 1,
under substantially anhydrous conditions;

(D) Producing a compound of the formula Ic:

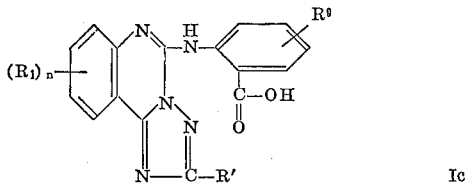

in which $R_1$, $n$, $R^0$ and $R'''$ are as defined above, by reacting a compound of the formula Ia in which R is alkyl or a compound of the formula Ib, with a strong base under hydrous conditions, preferably with an aqueous alkali metal hydroxide;

(E) Producing a compound of the formula Id:

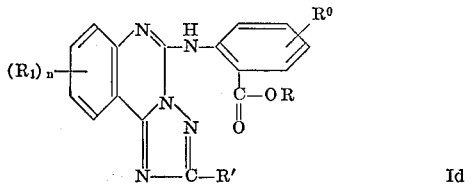

in which $R_1$, $n$, R, $R^0$ and $R'$ are as above defined, by reacting a compound of the formula VII:

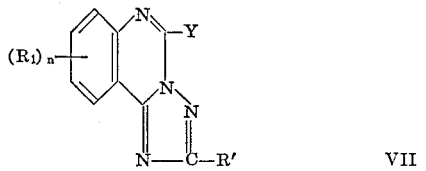

in which $R_1$, $n$, $R'$ and Y are as defined above, with a compound of the formula III, stated above;

(F) Producing a compound of the formula Id by heating a corresponding compound of the formula Ia in the presence of a lower carboxylic acid; or (G) Producing a compound of the formula Id by heating a corresponding compound o tfhe formula Ia above its melting point.

The preparation of compounds Ia by procedure A involving reaction of a compound II with a compound III may be conveniently carried out in a solvent medium at temperatures in the range of 10° C. to 120° C. In many forms of practice, it is convenient to employ an excess of the compound III as solvent for the reaction. Various of the several well-known conventional organic solvents may also be employed. Examples of the more suitable conventional solvents include chloroform, methylene chloride, ethanol, benzene, toluene and dioxane. The use of elevated temperatures may beneficially influence reaction rates although the preferred reaction temperatures may depend upon the choice of the reaction solvent.

The preparation of compounds Ib by procedure B may be effected by reaction of a compound Ia with a strong base under anhydrous conditions and is suitably carried out at a temperature of from 10° C. to 120° C., preferably 15° C. to 60° C., and in the presence of a solvent. Suitable solvents include inert, non-hydroxylic solvents, and also the alcohols corresponding to the compounds of the formula IV, for example, methanol when compound IV is a methoxide. The compound IV is most suitably the sodium salt and also R" desirably corresponds to any ester group in the compound of the formula Ia in order to avoid ester exchange and the formation of different esters of the formula Ib.

The preparation of compounds Ia by procedure C involving reaction of a compound V with a compound VI is suitably effected at temperatures of from 10° C. to 150° C., preferably at about 150° C. to 50° C. An inert solvent may be employed but the process is suitably effected employing an excess of the compound VI which is preferably the compound VI in which $m$ is 0, e.g., trimethoxy methane.

The preparation of compounds Ic by procedure D involving reaction of a compound Ia in which R is alkyl or a compound Ib may be conveniently carried out at temperatures of from 10° C. to 80° C. Preferred conditions involve temperatures between 15° C. to 50° C. The reaction is carried out in an aqueous medium and preferably with an inorganic base, the preferred bases being the alkali metal hydroxide such as sodium or potassium hydroxide.

The preparation of compounds Id by procedure E involving the reaction of a compound of the formula VII with a compound of the formula III is carried out analogously to procedure A.

The preparation of a compound Id by procedure F involves heating a corresponding compound of the formula Ia at temperatures in the range of from 70° C. to 180° C., preferably 100° C. to 160° C., in the presence of a lower carboxylic acid, preferably acetic acid, for extended time periods of typically at least 24 hours, preferably at least 36 hours. The reaction may be carried out in the presence of an inert organic solvent which is preferably of the higher boiling type such as an aromatic solvent, e.g., xylene.

The preparation of a compound Id by procedure G is suitably effected by fusing a corresponding compound of the formula Ia for moderate time periods of typically at least 1 hour, more usually about 2 to 4 hours.

The various compounds of formula I produced by the reactions of the above-described procedures A–G may be isolated and purified from the various systems in which they are formed by using conventional techniques. Where desired or required, free base forms of the basic compounds of formula I may be converted into acid addition salt forms in conventional manner, and vice versa.

The compounds of formula II may be produced by reacting a compound of formula VIII:

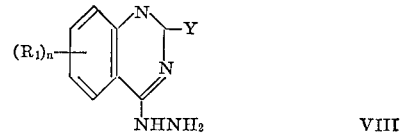

in which $R_1$, $n$ and Y are as defined above, with a compound of formula VI, stated above, under substantially anhydrous conditions. The process may be effected as described above for procedure C. The resulting compounds of formula II may be isolated and purified using conventional techniques.

The compounds of formula VIII, employed in producing compounds of formula II, may be produced by reacting a compound of formula IX:

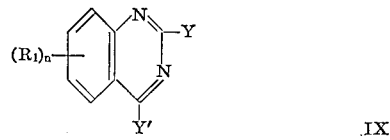

in which $R_1$, $n$ and Y are as defined above, and Y' signifies a chlorine or bromine atom, with hydrazine. The process is suitably carried out at a temperature of from 0° to 30° C., preferably 5° to 25° C., and in an inert organic solvent, such as an aromatic solvent, e.g., benzene or toluene, a chlorinated hydrocarbon, e.g., methylene chloride or a dialkylamide, e.g., dimethylacetamide. The resulting compounds of formula VIII may be isolated and purified using conventional techniques.

The compounds of formula IX are either known or may be produced in conventional manner from available materials, for example, by the procedures of Curd et al., J. Chem. Soc. *1948*, 1759 and Hens et al., J. Med. Chem. *11*, 130–136 (1968). In the prior art, 2,4-dichloro or dibromo quinazolines are produced by firstly cyclizing an anthranilic acid or ester with an alkali metal cyanate, preferably in acetic acid and at a temperature of from 80° to 120° C., o obtain the corresponding quinazoline-2,4-dione, and then reacting this with phosphorus oxychloride or oxybromide, suitably at a temperature of from 80° to 120° C. It has now been found advantageous to employ the methyl or ethyl ester of anthranilic acid rather than the acid itself.

The compounds of formula V, employed as sarting materials in procedure (C), may be produced by reacting a compound of formula VIII, stated above, with a compound of formula III, stated above, in a solvent. The process is suitably carried out analogously to procedure A. The compound V may be recovered from the reaction by conventional procedures.

The compounds of the formula VII employed as starting material in Procedure E are preferably prepared by halogenation of a compound of the formula X:

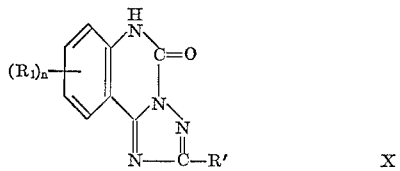

in which $R_1$, $n$ and $R'$ are as above defined. The preparation of compounds VII from X may be carried out in a conventional manner for halogenating a cyclic amide function. Preferably the reaction is carried out employing excess phosphorus oxychloride or phosphorus oxybromide as the halogenating agent and solvent for the reaction. Temperature for the reaction may vary fairly widely between 50° C. to 180° C., although the reaction is preferably conducted at the reflux temperature of the reaction mixture. If desired, a minor amount of a tertiary amine such as dimethylaniline may be employed as a catalyst for the reaction.

The compounds of the formula X may be prepared by subjecting a compound of the formula II either to the action of a concentrated organic acid followed by hydrolysis or to the action of a strong inorganic base in the presence of water whereby a combined hydrolysis and rearrangement takes place. The reaction of a compound II with an organic acid is effected at temperatures in the range of from 50° to 150° C., preferably 100° C. to 130° C., and preferably employs an excess of glacial acetic acid which also serves as the solvent for the reaction. The subsequent hydrolysis is readily effected, for example, by contacting the reaction product with water for short periods of time at about room temperature. The preparation of compounds X from compounds II in the presence of a base is suitably carried out at temperatures in the range of from 60° C. to 120° C., preferably 80° C. to 110° C. The more preferred strong bases include the alkali metal hydroxides, e.g. potassium hydroxide. The reaction is carried out in a liquid medium which is preferably water such that a preferred system for effecting the hydrolysis-rearrangement will constitute, for example, a 10% aqueous solution of potassium hydroxide.

The compounds of the formula III and IV employed in the various reactions described herein are either known or may be prepared from known materials by established procedures.

The compounds of structural formula I, are useful because they possess pharmacological activity in animals. In particular, the compounds of the formula I are useful as anti-inflammatory agents as indicated by the Carrageenin-induced edema test in rats and/or by the Adjuvant Arthritis test in rats involving the effecting of an inhibition of skin lesions provided by Freud's adjuvant in the guinea pig. For such use satisfactory results are obtained on the oral administration of a daily dose of from about 3 to 200 milligrams per kilogram of body weight, preferably given in divided doses, or in sustained release form. For most mammals the oral administration of from 200 to 3000 milligrams per day provides satisfactory results and dosage forms comprise from 50 to 1500 milligrams in admixture with a solid or liquid pharmaceutical carrier or diluent.

For above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient along or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation for treatment of inflammation on administration 2 to 4 times a day is a tablet prepared by conventional tabletting techniques and containing the following ingredients:

| Ingredients: | Weight (mg.) |
|---|---|
| 5-[2'-carbomethoxyphenylamino]-1,2,4-triazolo[1,5-c]quinazoline | 125 |
| Tragacanth | 10 |
| Lactose | 147.5 |
| Corn starch | 25 |
| Talcum | 15 |
| Magnesium stearate | 2.5 |

The preferred compounds from the standpoint of anti-inflammatory activity are the compounds having the triazolo[1,5-c]quinazoline structure.

The compounds of the formula I in which R is hydrogen may be converted to salt forms in which R is a cation. Such salt forms in which R is a pharmaceutically acceptable cation may be administered as pharmaceutical agents for the above-indicated usage in the same manner and at the same doses as indicated above for the other compounds of the formula I. Such pharmaceutically acceptable cations include, by way of illustration, the sodium, potassium and triethyl ammonium cation. In general, the salt forms may be produced from the corresponding acids, and vice versa, by conventional procedures.

The following examples are merely illustrative of specific compounds of the invention and the manner in which they may be prepared.

EXAMPLE 1

5-[2'-carbomethoxyphenylamino]-8,9-dimethoxy-1,2,4-triazolo[4,3-c]quinazoline

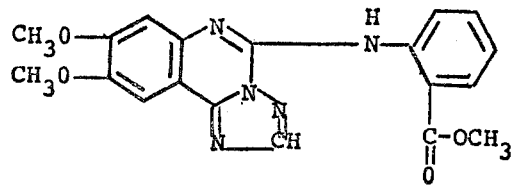

Step A: Preparation of 6,7-dimethoxy-2-chloro-4-hydrazinoquinazoline: To a solution of 20.8 g. of 2,4-dichloro-6,7-dimethoxy-quinaozline in 400 ml. of methylene chloride is added dropwise 20 g. of hydrazine while maintaining the temperature below 30° C. with cooling. The resulting mixture was stirred for 45 minutes and then allowed to stand overnight at a temperature of 0° C. The mixture is then filtered and the solids washed first with water and then with methanol. The resulting solid material is then taken up in ice-water and stirred for 20 minutes. The mixture is then filtered and the resulting solid is recrystallized from methanol/methylene chloride to obtain 6,7 - dimethoxy-2-chloro-4-hydrazino-quinazoline, m.p. 312–315° C. (decomp.).

Step B: Preparation of 5-chloro-8,9-dimethoxy-1,2-triazolo[4,3-c]quinazoline: A mixture of 10.0 g. of 6,7-dimethoxy-2-chloro-4-hydrazino-quinazoline, 1.0 g. of p-toluenesulfonic acid and 150 ml. of trimethoxy methane is refluxed with stirring for 19 hours and then stirred for 24 hours at room temperature. The resulting mixture is evaporated in vacuo to dryness and the residue dissolved in 1500 ml. of methylene chloride. This solution is extracted twice with sodium carbonate solution, washed neutral with water, dried and evaporated in vacuo to dryness. The residue is twice crystallized from methylene chloride/diethyl ether and then from ethanol to obtain 5 - chloro - 8,9 - dimethoxy - 1,2,4-triazolo[4,3-c]quinazoline, m.p. 269–271° C.

Step C: Preparation of 5-[2'-carbomethoxyphenylamino]-1,2,4-triazolo[4,3-c]quinazoline: A mixture of 35 g. of 5 - chloro - 8,9-dimethoxy-1,2,4-triazolo[4,3-c]quinazoline, 270 g. of methyl anthranilate and 900 ml. of dioxane refluxed for 2 hours and the resulting mixture evaporated in vacuo to dryness. The residue is taken up with diethyl ether and filtered. The resulting solid is then taken up in methylene chloride (1000 ml.), washed five times with water, dried, evaporated in vacuo to dryness and the residue recrystallized from methylene chloride to obtain 5-[2'-carbomethoxyphenylamino]-8,9-dimethoxy - 1,2,4 - triazolo[4,3-c]quinazoline, m.p. 260–265° C.

EXAMPLE 2

5-[2'-carbomethoxyphenylamino]-1,2,4-triazolo-[4,3-c]quinazoline

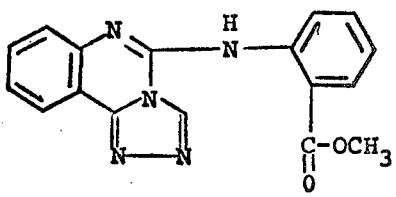

A mixture of 12.0 gms. of 5-chloro-1,2,4-triazolo[4,3-c]quinazoline and 90 gms. of methyl anthranilate is refluxed in 300 ml. dioxane for 2 hours. Solvent is then removed in vacuo, residue treated with ether and the solids thus obtained are filtered and washed with ether. The solids are taken up in 500 ml. ethylacetate; the ethylacetate layer is then washed three times with water, dried over sodium sulfate, filtered and solvent removed in vacuo. From the residue is crystallized with 95% ethanol the desired 5[2' - carbomethoxyphenylamino] - 1,2,4-triazolo-[4,3-c]quinazoline, m.p. 220–222° C.

EXAMPLE 3

Following the procedure of Examples 1 and 2 the following additional compounds of the invention are prepared:

(a) 5-[2'-carbomethoxyphenylamino]-3-methyl-1,2,4-triazolo[4,3-c]quinazoline.
(b) 5-[2'-carboethoxyphenylamino]-3-ethyl-1,2,4-triazolo[4,3-c]quinazoline.
(c) 5-[2'-carbomethoxyphenylamino]-9-chloro-1,2,4-triazolo[4,3-c]quinazoline.
(d) 5-[2'-carbomethoxyphenylamino]-9-trifluoromethyl-1,2,4-triazolo[4,3-c]quinazoline.
(e) 5-[6'-chloro-2'-carbomethoxyphenylamino]-1,2,4-triazolo[4,3-c]quinazoline.
(f) 5-[6'-chloro-2'-carbomethoxyphenylamino]-1,2,4-triazolo[4,3-c]quinazoline.
(g) 5-[5'-trifluoromethyl-2'-carbomethoxyphenylamino]-1,2,4-triazolo[4,3-c]quinazoline.
(h) 5-[2'-carboxyphenylamino]-1,2,4-triazolo[4,3-c]quinazoline.
(i) 4-[2'-carbomethoxyphenylamino]-8,9-methenedioxy-1,2,4-triazolo[4,3-c]quinazoline.

EXAMPLE 4

5-[2'-carbomethoxyphenylamino]-1,2,4-triazolo[1,5-c]quinazoline

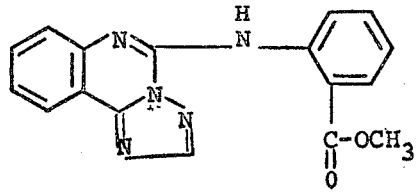

To a solution of 2 gms. of 5-[2'-carbomethoxyphenylamino]-1,2,4-triazolo-[4,3-c]quinazoline in 120 ml. methanol is added 400 mg. of sodium methoxide and the reaction mixture is refluxed for 4 hours. The solvent is then removed in vacuo, the residue taken up in methylene chloride, and methylene chloride layer is washed three times with water, dried over sodium sulfate, filtered and the solvent removed in vacuo. From the residue is crystallized from methylene chloride/ether the desired 5-[2'-carbomethoxyphenylamino]-1,2,4 - triazolo-[1,5-c]quinazoline, m.p. 229–233° C.

EXAMPLE 5

Following the procedure of Example 4 the following additional compounds of this invention are prepared.

(a) 5-[2'-carbomethoxyphenylamino]-8,9-methoxy-1,2,4-triazolo[1,5-c]quinazoline, m.p. 285–288° C.
(b) 5-[2'-carbomethoxyphenylamino]-2-methyl-1,2,4-triazolo[1,5-c]quinazoline.
(c) 5-[2'-carboethoxyphenylamino]-2-ethyl-1,2,4-triazolo[1,5-c]quinazoline.
(d) 5-[2'-carbomethoxyphenylamino]-9-chloro-1,2,4-triazolo[1,5-c]quinazoline.
(e) 5-[2'-carbomethoxyphenylamino]-9-trifluoromethyl-1,2,4-triazolo[1,5-c]quinazoline.
(f) 5-[6'-chloro-2'-carbomethoxyphenylamino]-1,2,4-triazolo[1,5-c]quinazoline.
(g) 5-[5-trifluoromethyl-2'-carbomethoxyphenylamino]-1,2,4-triazolo[1,5-c]quinazoline.

EXAMPLE 6

5-[2'-carboxyphenylamino]-1,2,4-triazolo[1,5-c]quinazoline

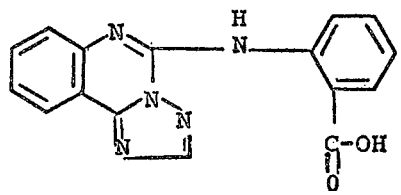

A suspension of 2.3 g. of 5-[2'-carbomethoxyphenylamino]-1,2,4-triazolo[4,3-c]-quinazoline in 100 ml. 2N NaOH is stirred at room temperature for 48 hours. At the end of this period is obtained a clear solution. This solution is then made acidic by addition of hydrochloric acid solution and the product thus obtained is filtered, washed well with water and dried. On drying is obtained the desired 5 - [2'-carboxyphenylamino]-1,2,4-triazolo-[1,5-c]-quinazoline, m.p. 300° C.

EXAMPLE 7

Following the procedure of Example 7 the following compound is prepared.

(a) 5-[2'-carboxyphenylamino]-8,9-dimethoxy-1,2,4-triazolo[1,5-c]quinazoline.
(b) 5-[2'-carboxyphenylamino]-2-methyl-1,2,4-triazolo[1,5-c]quinazoline.

EXAMPLE 8

Preparation of 5-chloro-8,9-dimethoxy-1,2,4-triazolo[1,5-c]quinazoline

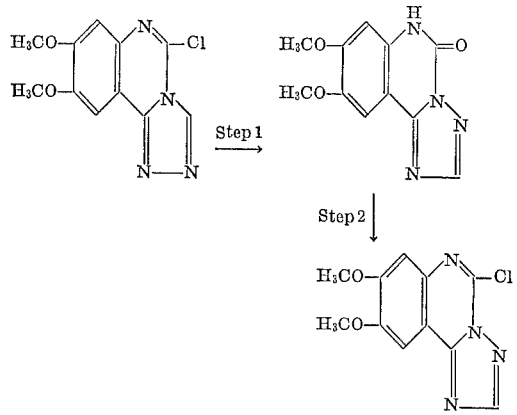

Step 1: 8,9 - Dimethoxy-1,2,4-triazolo-[1,5-c]quinazoline-5-one: 500 mg. of 5-chloro-8,9-dimethoxy-1,2,4-triazolo-[4,3-c]quinazoline is refluxed with 50 ml. glacial acetic acid for 1 hour. The mixture is then evaporated in vacuo to dryness. The residue is treated with water/methylene chloride/diethyl ether and the solid material which is 8,9-dimethoxy-1,2,4-triazolo-[1,4-c]quinazoline-5-one is filtered off, washed well with water, then diethyl ether and dried, m.p. 320–325° C.

Step 2: 5 - chloro-8,9-dimethoxy-1,2,4-triazolo-[1,5-c]quinazoline: 300 mg. of 8,9-dimethoxy-1,2,4-triazolo[1,4-c]quinazoline-5-one is refluxed with 5 ml. phosphorous oxychloride and a catalytic amount of N,N-dimethylaniline for 18 hours. The reaction mixture is then evaporated in vacuo to dryness; the residue taken up in methylene chloride and the methylene chloride layer extracted several times with cold sodium bicarbonate solution, with water, dried and then evaporated in vacuo to dryness. The residue is crystallized from methylene chloride/diethyl ether to give 5-chloro-8,9-dimethoxy-1,2,4-triazolo-[1,5-c]quinazoline, m.p. 258–260° C.

EXAMPLE 8A

Following the procedure of Example 6 the following compounds may be prepared:

(a) 1,2,4 - triazolo[1,5-c]quinazoline-5-one, m.p. 310–314° C.
(b) 5-chloro-1,2,4-triazolo[1,5-c]quinazoline.

What is claimed is:
1. A compound of the formula:

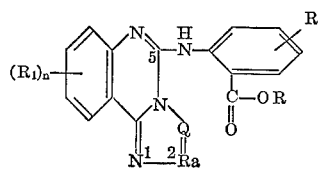

wherein
Q and $R_a$ are different and either a nitrogen atom or a =CR'— function;
R is hydrogen, alkyl of 1 to 4 carbon atoms or a pharmaceutically acceptable cation;
$R^0$ is hydrogen, alkyl of 1 to 4 carbon atoms, halo of atomic weight of from 18 to 36, alkoxy of 1 to 4 carbon atoms or trifluoromethyl;
R' represents hydrogen or alkyl of 1 to 4 carbon atoms;
$R_1$ represents halo of atomic weight of from 18 to 80, alkyl of 1 to 3 carbon atoms, alkoxy of 1 to 3 carbon atoms, trifluoromethyl or, when $n$ is 2, the two $R_1$ together form methylenedioxy; and
$n$ is 0, 1 or 2, and when 2, then $R_1$ may be the same or different; provided that $n$ is 1 when $R_1$ is trifluoromethyl.

2. A compound of Claim 1 having the formula

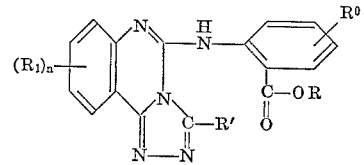

in which $R_1$, $n$, R, $R^0$ and R' are as defined in Claim 1.
3. A compound of Claim 2 in which $R_1$ is selected from the group consisting of hydrogen and alkoxy.
4. A compound of Claim 3 in which $R^0$ is hydrogen.
5. A compound of Claim 1 in which R is alkyl.
6. A compound of Claim 1 in which R is hydrogen.
7. A compound of Claim 1 having the formula:

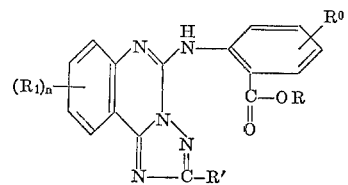

in which $R_1$, $n$, R, $R^0$ and R' are as defined in Claim 1.
8. A compound of Claim 7 in which $R_1$ is selected from the group consisting of hydrogen and alkoxy.
9. A compound of Claim 8 in which $R^0$ is hydrogen.
10. A compound of Claim 7 in which R is alkyl.
11. A compound of Claim 7 in which R is hydrogen.
12. The compound of Claim 10 which is 5-[2'-carbomethoxyphenylamino]-1,2,4-triazolo[1,5-c]quinazoline.
13. The compound of Claim 11 which is 5-[2'-carboxyphenylamino]-1,2,4-triazolo[1,5-c]quinazoline.
14. A compound of Claim 8 in which $R_1$ is hydrogen.
15. A compound of Claim 8 in which $(R_1)_n$— is 8,9-dimethoxy.

References Cited
UNITED STATES PATENTS
3,281,408  10/1966  Wagner _____ 260—256.4 F
FOREIGN PATENTS
780,435  3/1968  Canada _____ 260—256.4 F DONALD G. DAUS, Primary Examiner
J. H. TURNIPSEED, Assistant Examiner U.S. Cl. X.R.
260—256.4 Q; 424—251